United States Patent [19]

Mitchell et al.

[11] 3,966,519
[45] June 29, 1976

[54] METHOD OF BONDING FIBROUS WEBS

[75] Inventors: Kenneth J. Mitchell, Neenah; Kurt W. Ostermeier, Harrison, both of Wis.

[73] Assignee: Kimberly-Clark Corporation, Neenah, Wis.

[22] Filed: Dec. 27, 1974

[21] Appl. No.: 536,728

[52] U.S. Cl. .......................... 156/73.1; 19/161 P; 28/1 HF; 28/72.2 F; 156/580; 428/296
[51] Int. Cl.² ........................................ B32B 31/22
[58] Field of Search ................. 156/73.1, 73.3, 580; 28/72.2 F, 1 HF; 19/161 P; 428/296

[56] References Cited
UNITED STATES PATENTS

| | | | |
|---|---|---|---|
| 3,150,416 | 9/1964 | Such ........................ | 19/161 P |
| 3,304,593 | 2/1967 | Barklund .................. | 28/72.1 |
| 3,324,527 | 6/1967 | Such ........................ | 19/161 P |
| 3,746,589 | 7/1973 | Reinke ..................... | 156/73.1 |

FOREIGN PATENTS OR APPLICATIONS

| | | | |
|---|---|---|---|
| 1,158,475 | 7/1969 | United Kingdom .......... | 28/72.1 |

*Primary Examiner*—Edward G. Whitby
*Attorney, Agent, or Firm*—Daniel J. Hanlon, Jr.; William D. Herrick; Raymond J. Miller

[57] ABSTRACT

Fibrous webs are bonded by passing through a nip comprising an anvil and a hammer vibrating at high frequencies in the presence of uncombined liquid. The liquid is moved within the web causing rearrangement and entanglement of the fibers resulting in improved web properties such as strength, drape, and softness. The nature of the rearrangement and entanglement may be varied to produce random or highly entangled webs having correspondingly varying properties. Other embodiments include the use of additional fibers or other materials in the liquid or in the web and the bonding of multiple layers.

14 Claims, 20 Drawing Figures

METHOD OF BONDING FIBROUS WEBS

BACKGROUND OF THE INVENTION

1. Field of the Invention

This invention pertains to bonded fibrous webs and methods for bonding and rearranging the fiber structure of such webs. It finds particular utility in the bonding and rearranging of nonwoven fabrics for limited use applications. More particularly, it relates to such bonding and rearranging of fibers in a web through the use of high frequency vibrational energy. In its common form, such an application is referred to as ultrasonic bonding although the frequency range is not limited to those above sonic frequencies.

Nonwoven webs and fabrics have gained wide acceptance and are in common use as protective garments, wipers, health care items (such as bed linens, surgical drapes, and the like) and as elements of many other more durable products.

2. Description of the Prior Art

As formed, most nonwoven webs lack sufficient strength for many applications and must be reinforced through the use of adhesives, embossing, activation of thermoplastic material, or by combining with a reinforcing web. In addition to the cost occasioned by each of these steps, the resulting products suffer a loss in one or more desirable properties such as hand, drape, softness, and the like. Therefore, the design of a nonwoven material usually involves a compromise between fabric strength and its other properties.

Recently there have been developed methods of bonding nonwoven webs and increasing their strength properties without necessitating such conventional bonding steps and their inherent drawbacks. These newly developed processes rely on the entanglement of the fibers which make up the web for consolidation and strengthening. Examples include needling, which is described generally in U.S. Pat. Nos. 3,538,564 to Skoler et al issued Nov. 10, 1970; 3,758,926 to Dilo issued Sept. 18, 1973; 3,783,479 to Terry issued Jan. 8, 1974; and 3,827,112 to Betere issued Aug. 6, 1974; for example, and fluid jet entanglement, which is described in U.S. Pat. Nos. 3,129,466 to L'Hommedieu issued Apr. 21, 1964; 3,214,819 to Guerin issued Nov. 2, 1965; 3,485,706 to Evans issued Dec. 23, 1969; 3,042,576 to Harmon et al issued July 3, 1962; 3,081,500 to Griswold el al issued Mar. 19, 1963; 3,683,921 to Brooks et al issued Aug. 15, 1972; as well as Kalwaites U.S. Pat. Nos. 2,862,251 issued Dec. 2, 1958; 3,769,659 issued Nov. 6, 3,800,364 issued Apr. 2, 1974; and others. Needling is inherently a slow process, and the formation and handling of fluid jets requires cumbersome and costly equipment.

Bonding of many diverse materials, including fibrous web structures, by sonic means is rapidly becoming a developed art. Thus, it is known to cause welding of thermoplastic fibers, films, and articles by heat generated due to the frictional forces resulting from vibrations of the sonic horn. Alternatively, the ultrasonic vibrations can be used to promote hydrogen bonding in cellulosic webs or to activate a previously applied adhesive as shown, for example, in U.S. Pat. No. 3,660,186 to Sager et al issued May 2, 1972 which is assigned to the present assignee of this application. In the manufacturing of nonwovens, however, the use of ultrasonics for activation of thermoplastics of for activation of adhesives has intended to suffer the same drawbacks as such bonding obtained by conventional means. That is, the webs produced lack a desirable degree of hand, drape, and softness.

SUMMARY OF THE INVENTION

In accordance with aspects of the present invention the fibers making up a base web are rearranged and bonded by interlocking as a result of exposure to high frequency vibrations against a patterned anvil in the presence of uncombined liquid. While the invention is not to be limited to any particular theory, it is believed that the high frequency vibrations cause cavitation and vortices to form in the liquid moving it within the web and producing intense tangling and fiber rearrangement. Depending upon the conditions of operation, the cavitation and vortices may be directed in combination with the horn and the supporting surface to form webs varying from closed to highly apertured. The bonded webs are characterized by varying fiber intensity and increased strength with high levels of hand, drape, and softness.

The process of the invention may be used to increase the strength of a single fibrous base web layer or to combine two or more such layers in a single bonding step. In accordance with the invention, fibrous webs may be consolidated from a loose array of fibers or bonded to themselves or other fibrous webs. Further, in accordance with the invention, short fibers and other materials such as adhesives may be included in the liquid or in the fibrous batt and provide for additional increases in strength properties or other web improvements.

Thus, the present invention provides improved nonwoven webs and avoids the speed limitations and the need for fluid jets which accompanied known processes and their resulting products.

DESCRIPTION OF THE PREFERRED EMBODIMENT

While the invention will be described in connection with preferred embodiments, it will be understood that it is not intended to limit the invention to these embodiments. On the contrary, it is intended to cover all alternatives, modifications, and equivalents as may be included within the spirit and scope of the invention as defined by the appended claims.

The present invention obtains two-fold effects of fiber rearrangement to produce areas of apertures or low fiber concentration and bonding by intense interlocking or knotting of fibers in areas of higher fiber concentration.

In its broadest aspects, since these effects are obtained primarily through physical movement of fibers, the method of the present invention may be utilized to bond or increase the strength of a wide variety of fibrous webs having no or some prebonding or compaction as long as the fibers are free to move into a matrix from random to highly oriented. The fiber dimensions may be varied within wide ranges, for example, from about ¼ inch to 4 inches in length and 1 to 10 denier. In general, longer fibers add strength but tend to be less mobile. Preferably, however, the fibers are of the size and dimension conventionally used for the particular application for which the web is designed. Thus, for wiper materials the fibers range from 1.5 to 3 denier and ¼ inch to 2 inches in length. For nonwoven garments, longer fibers are preferred. Fiber dimensions are related to the bond pattern in that the fiber length should span at least two bond areas unless web strength is provided by other means.

Similarly, the chemical composition of the fibers is not critical so long as they are sufficiently flexible and mobile to be affected by the liquid action and possess sufficient surface roughness to be interlocked in the higher fiber density areas. Examples of useful materials include thermoplastics such as the polyolefins, particularly polyethylene and polypropylene, other polymer fibers such as nylon, rayon, polyurethanes, polyacrylates, and natural fibers such as wood, cotton, jute, flax, wool, and so forth. For most nonwoven applications, inexpensive polymeric fibers having low denier and the ability to shrink under post treatment are preferred.

The particular liquid selected involves primarily a matter of choice. Water is preferred due to its avalability, ease of use, and low cost. Examples of other liquids which can be used include organic liquids such as mineral oils and hydrocarbons.

Figure 1:
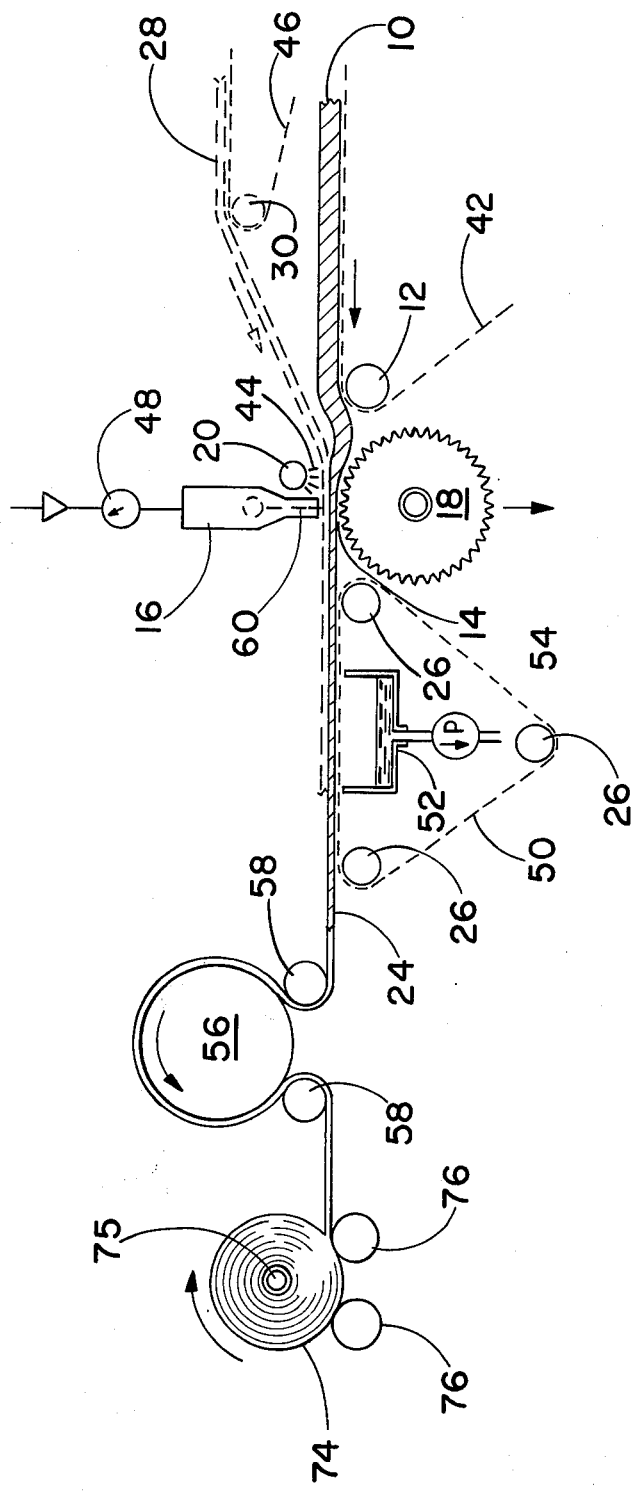
FIG. 1 illustrates in schematic form one arrangement of apparatus which can be used to carry out the method of the invention.
Figure 2:
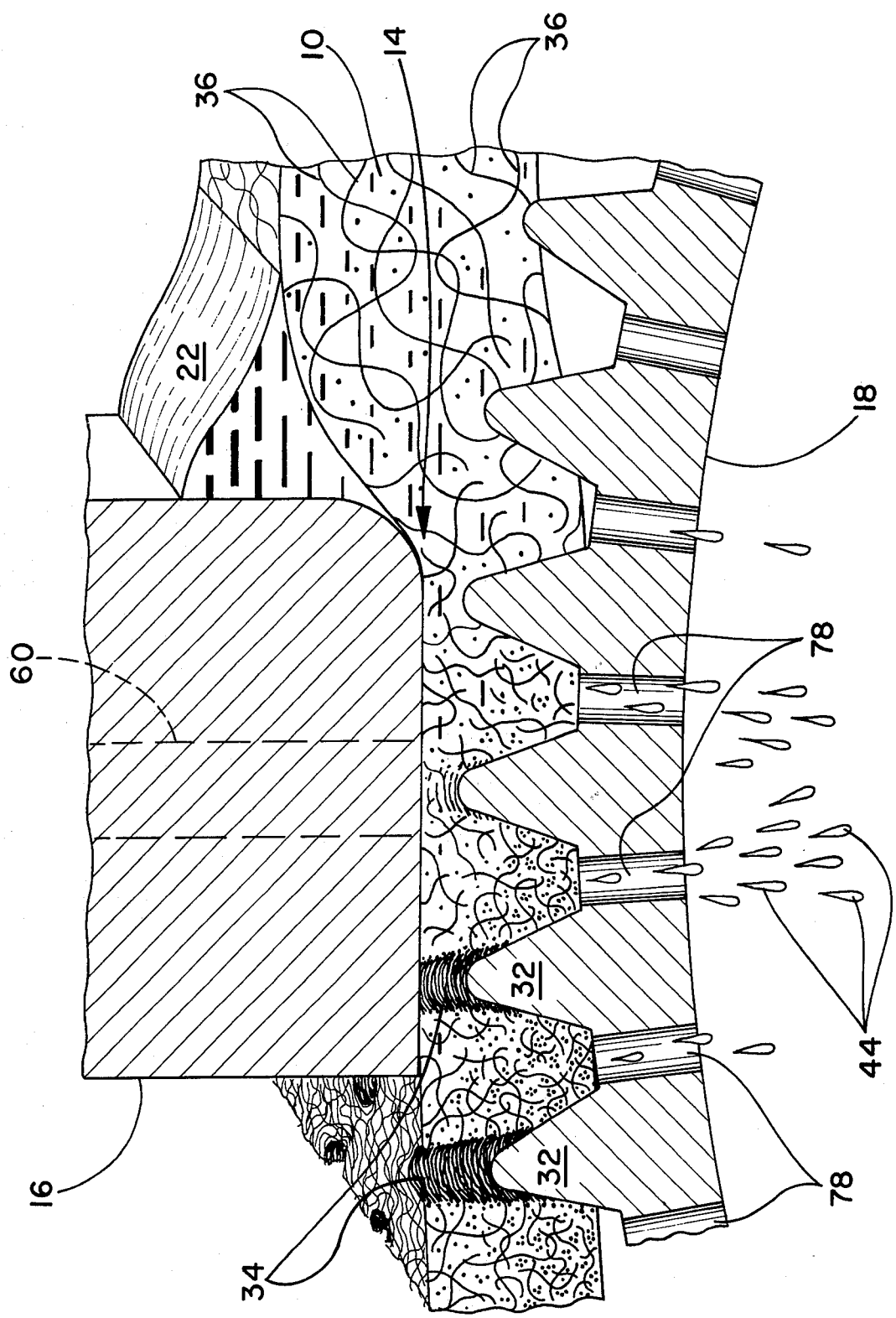
FIGS. 2 through 4 illustrate in greater detail the sonic nip arrangement shown in FIG. 1.

Turning now to the drawings, FIG. 1 illustrates one arrangement which is suitable for the present invention. Unbonded fibrous web 10 supported by wire 42 is drawn over idler roll 12 into nip 14 between sonic horn 16 and patterned anvil roll 18. Fluid nozzle 20 connected to a source of liquid (not shown) provides a quantity of liquid 44 sufficient to produce an amount uncombined with the web illustrated as ponding at 22 (FIG. 2). The horn is connected to a power supply (and driven at a high frequency, preferably in the ultrasonic range). The nip gap is set so that the horn at least contacts liquid on the web surface, and, preferably, slight pressure is applied to the horn against the wetted web as indicated schematically at 48. From the nip, bonded web 24 is drawn over idler rolls 26 supported by wire 50 while additional liquid is removed by vacuum box 52 and pump 54, after which the web may be dried by means of heated drum 56 and wrap rolls 58 and then wound into finished roll 74 on core 75 supported by rolls 76 either or both of which may be driven or the web may be otherwise treated. Shown in phantom lines also in FIG. 1 is an alternative embodiment wherein second web 28 is drawn over idler roll 30 on wire 46 and combined in nip 14 with fibrous web 10. Also illustrated in phantom in FIGS. 1 and 2 is an alternative means of supplying water to web 10 directly at nip 14 through conduit 60 in horn 16. This may be utilized in place of or in addition to liquid spray 44.

Figure 3:
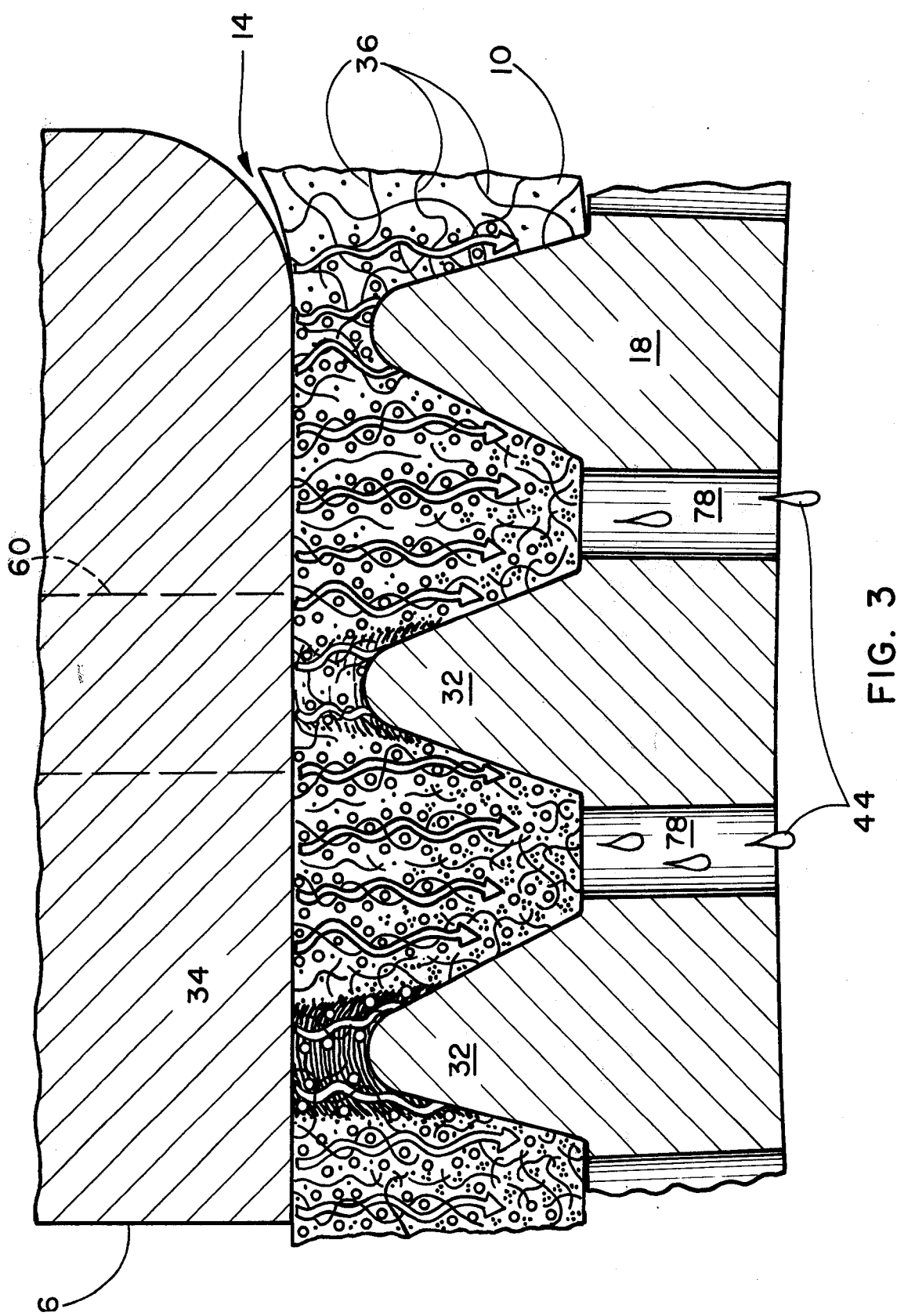

FIGS. 2 and 3 illustrate in schematic form and greater detail the application of vibrational energy at nip 14. As shown, liquid 44 is forced by the action of anvil 16 through web 10 and around the projection 32 (exaggerated for purposes of illustration) and into anvil roll 18 through channels or conduits 78. This creates cavitation resulting in vortices and an intense interlocking or positive knotting of the individual fibers 36 in web 10 to progressively form bond areas 34 as will be described further in connection with subsequent Figures. In FIG. 3 arrows are used to illustrate the vortex effect that tends to drive fibers 36 downward and concentrate them about the periphery of channels 78.

Figure 4:
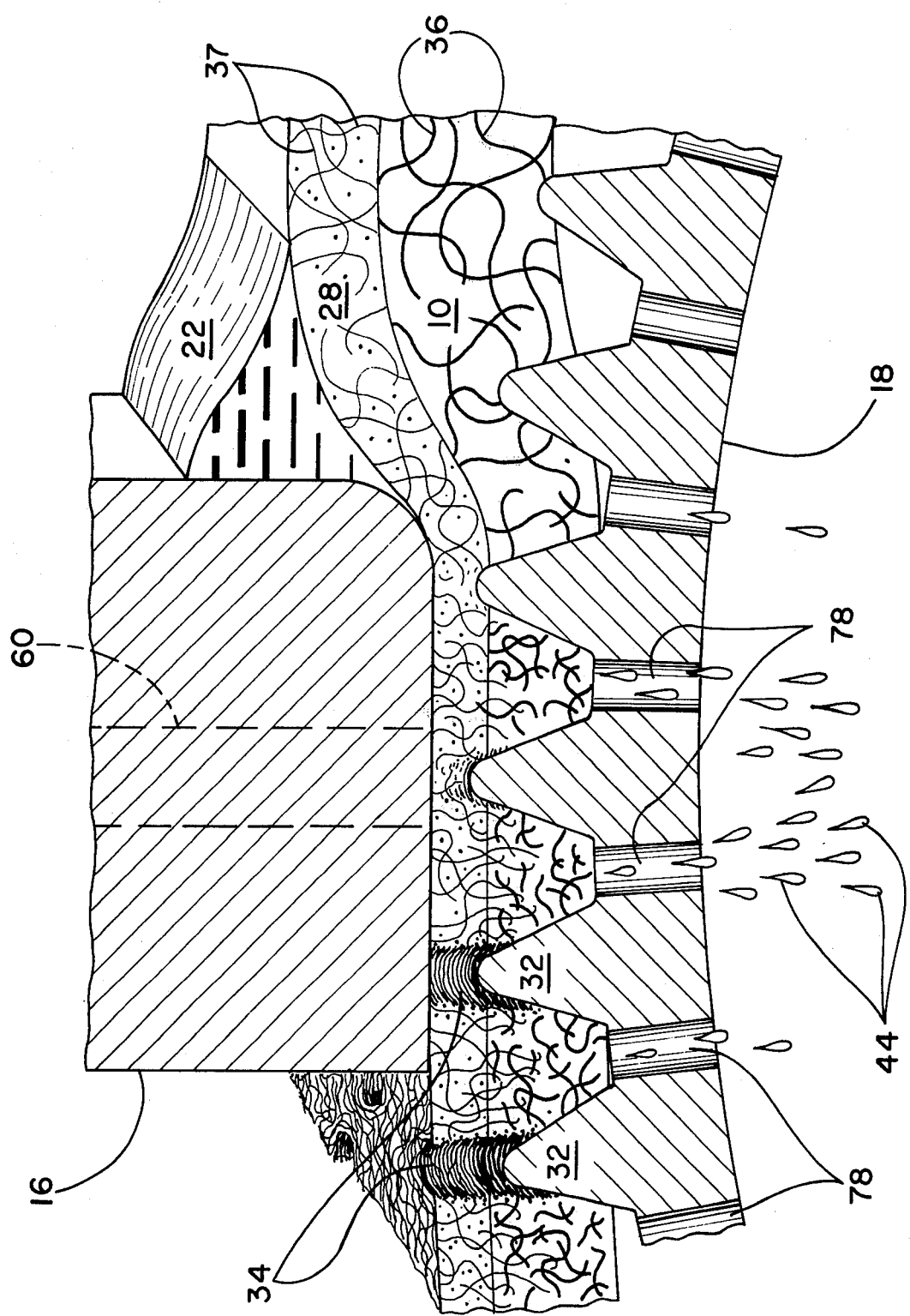

FIG. 4 is a view like that of FIG. 2 showing the combining of two webs as illustrated in phantom lines in FIG. 1. While a line schematically defines the boundary between the layers for illustrative purposes, in practice this boundary is not that well defined as the individual fibers 37 of second web 28 are driven through the web 10 and have a riveting or interlocking effect between the two webs. The result is a strong bonding of the two layers.

Figure 5:
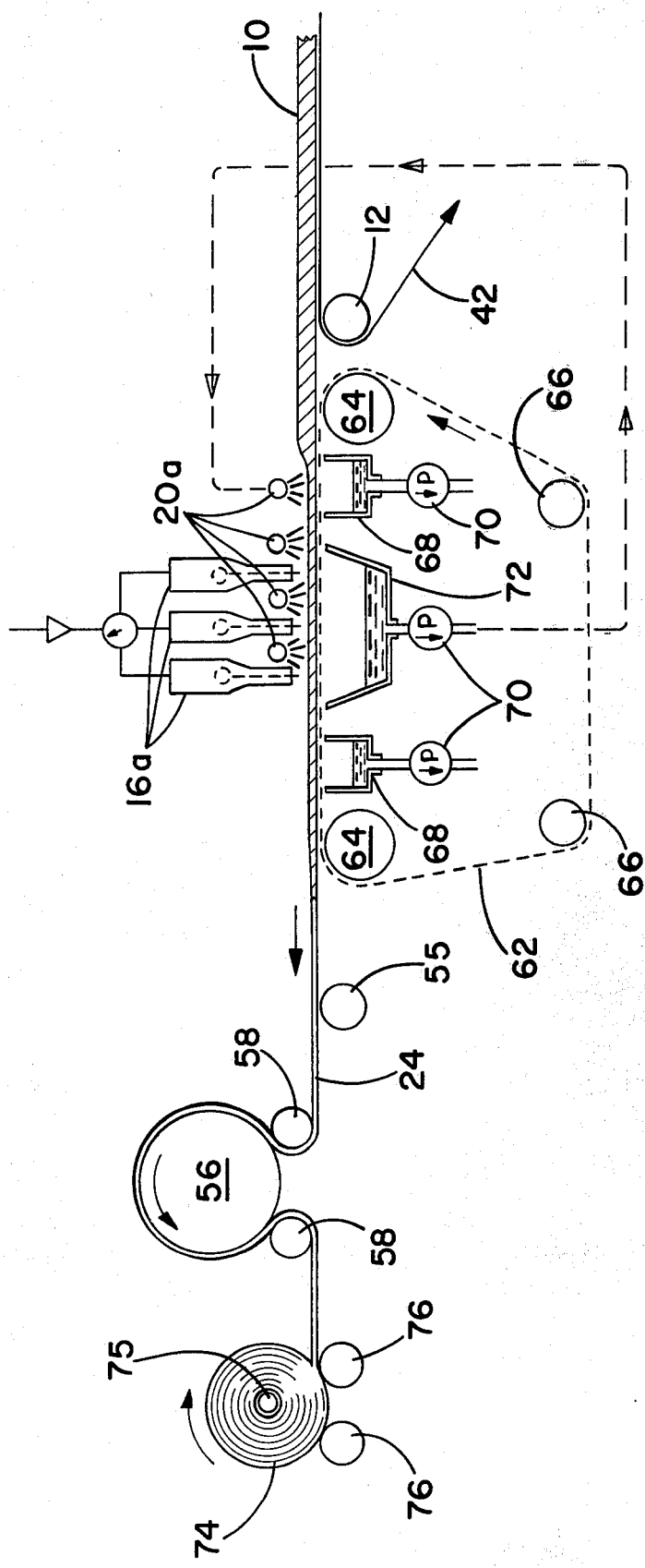
FIG. 5 illustrates an alternative arrangement.
Figure 6:
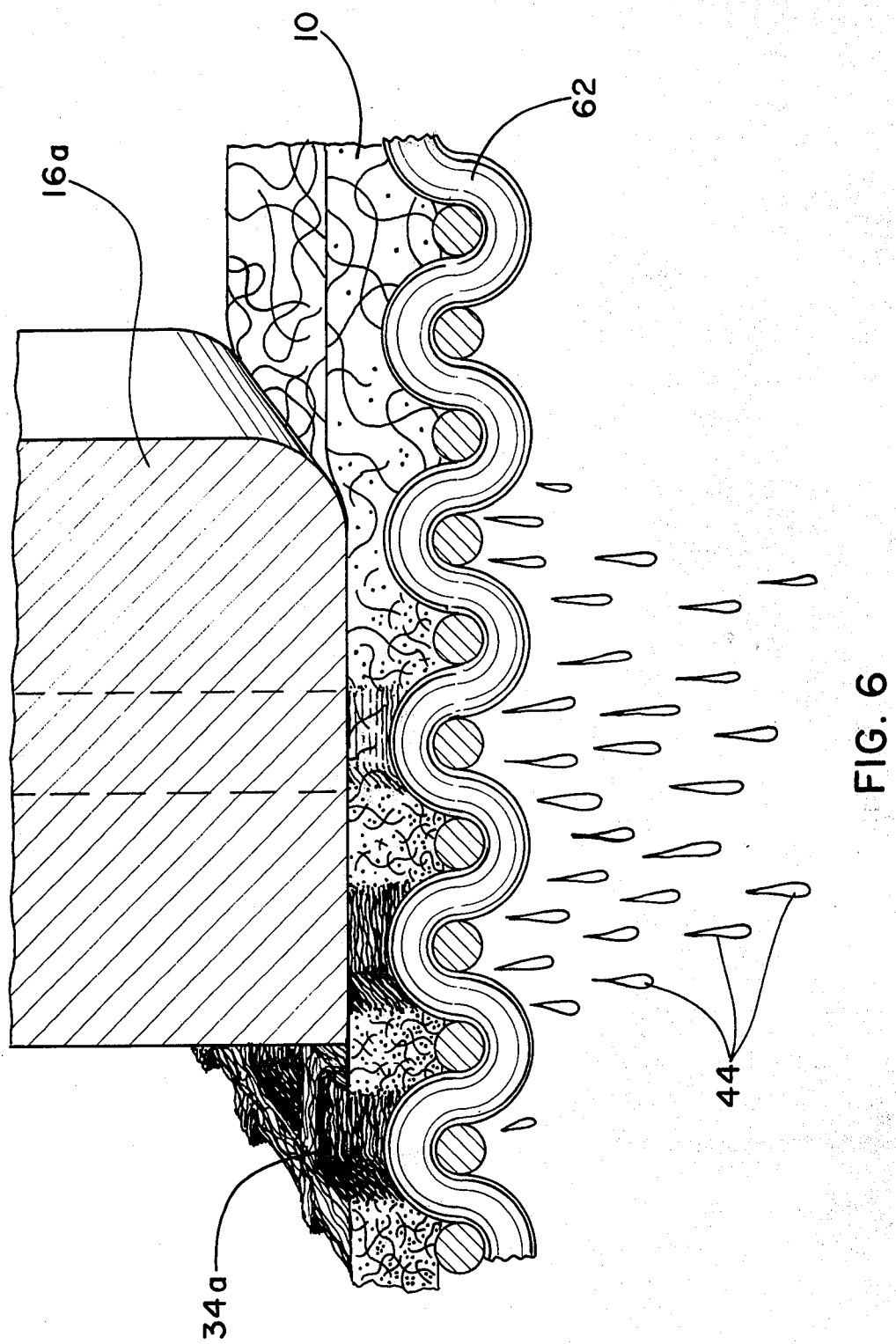
FIG. 6 illustrates in greater detail the sonic nip of FIG. 5.

FIG. 5 illustrates an alternative arrangement providing for multiple applications of vibrational energy through a plurality of horns 16A and spray devices 20A. In the arrangement illustrated anvil roll 18 (FIG. 1) is replaced by liquid permeable fabric 62 driven by conventional drive mechanism (not shown) about rolls 64 and 66. Additional water removal devices, illustrated as vacuum boxes 68 in conjunction with pump 70 may be included where total liquid flow is increased beyond that removed by catch basin 72. As shown in greater detail in FIG. 6 which is an enlarged view (again with details exaggerated for clarity) of the nip of one of the horns of FIG. 4, fabric 62 preferably has a high loft to impart a pleasing texture to the resulting product with bonded areas 34A having a more rectangular configuration, for example. As illustrated, fabric 62 may be in the form of a double knit structure. The remainder of the apparatus in this arrangement is as described with respect to FIG. 1 except that support roll 55 is employed ahead of dryer 56. As the detail of FIG. 6 shows, liquid 44 in generally increased quantities flows through fabric 62 in more uniform distribution as contrasted to the stream flow through the individual holes 78 in the circumference of drum 18 (FIG. 2).

Figure 8:
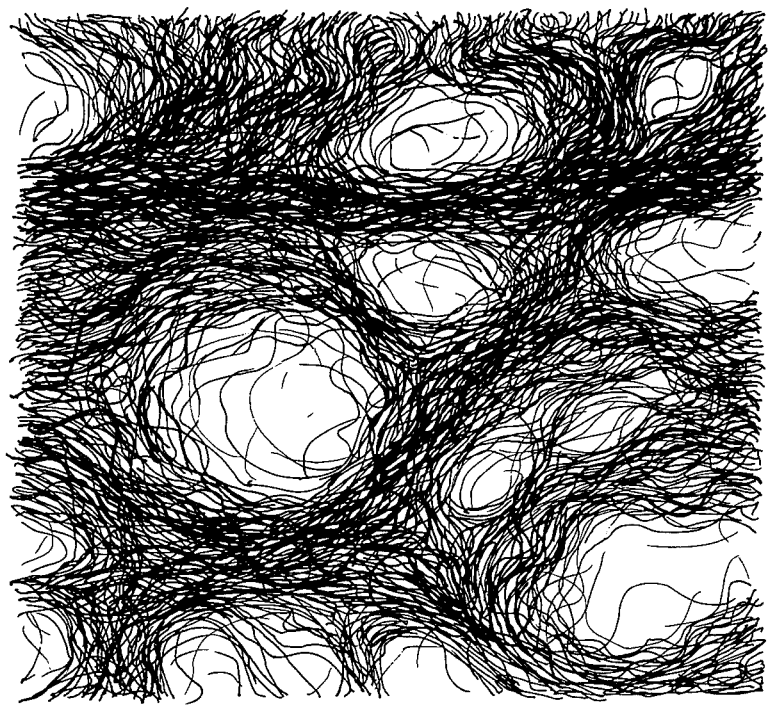
FIGS. 7–10 illustrate webs bonded in accordance with the invention with various degrees of bonding and rearrangement.
Figure 7:
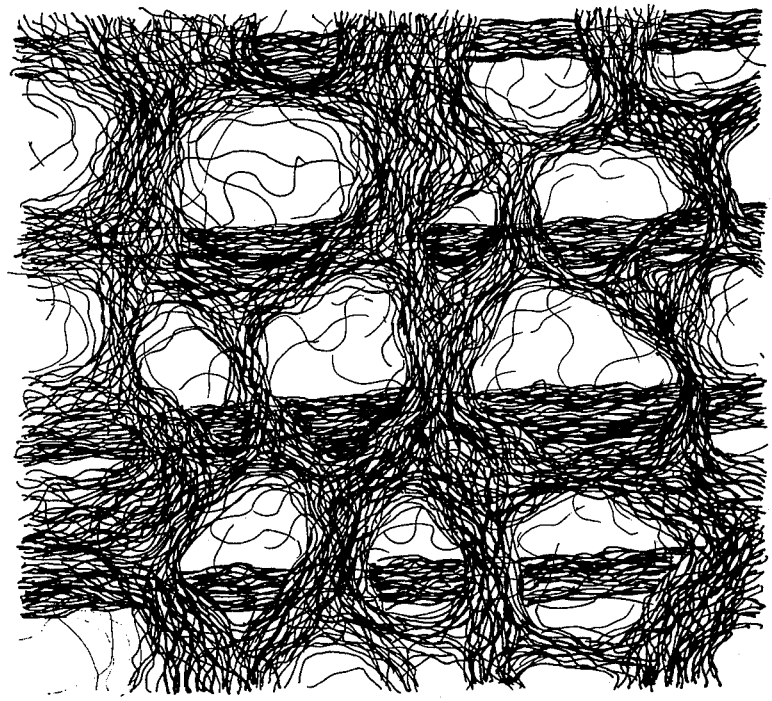
Figure 9:
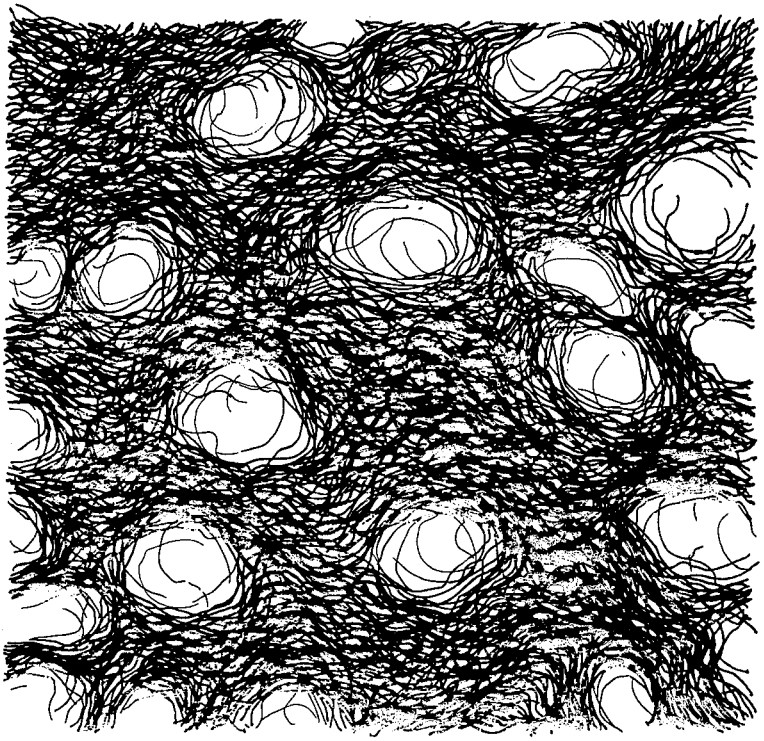
Figure 10:
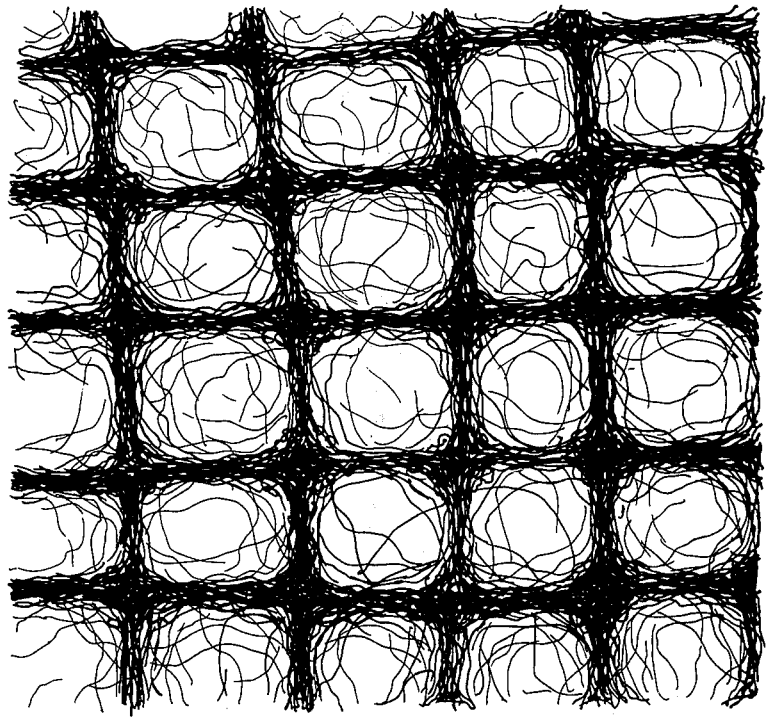

FIGS. 7–10 illustrates bonded webs in accordance with the invention having varying degrees of bonding. FIG. 7 shows the case where a large quantity of liquid, in excess of that which the ultrasonic horn is able to drive through the web, was used to produce an apertured material. The action of the vortices in the liquid caused the filaments 38 to be moved, oriented and entangled around each other in the area of the apertures. Any bonding of the filaments which occurred was concentrated at the perimeter of the aperture 40. In FIG. 8 a lesser amount of liquid was applied at the nip which produced a material with appreciably more bonded area, although it was again concentrated at the perimeter of the aperture. The filaments and fibers in this area were similarly oriented. FIG. 9 illustrates the case where even less liquid has been applied at the nip with the result that fewer fibers were entangled and oriented around the bond area. Some fibers have not been displaced from the bond areas resulting in smaller areas of reduced entanglement with fibers which slip out more easily when the material is stretched. If desired, by controlling the relative fiber and liquid amounts in this manner, a non-apertured web may be formed. FIG. 10 illustrates the case where two webs were combined and the material has the fibers of the web distributed throughout the bond areas of both layers.

The photomicrographs of FIGS. 11–20 will be discussed in conjunction with specific examples.

The following examples illustrate specific embodiments of the invention.

EXAMPLE 1

The apparatus illustrated in FIGS. 1 and 2 was used to treat an air formed, randomly oriented web having a width of about 10 inches and a weight of about 30 grams per square yard and formed on a Rando-webber of fibers having some Z directionality with an average length of about 0.5 inch and an average denier in the range of about 3 to 5 composed of about 50% viscose rayon and 50% polyester (polyethylene terephthalate).

The anvil roll was of steel construction having raised land areas arranged in a diagonal pattern across the roll face surface. Each raised land area was frustum shaped having a diameter of about 1.5 mm at the base and about 0.3 mm at the top with a height of about 2 mm above the trough formed by the rows of land area projections. The projection density was about 25 per square inch.

A Branson Sonic Power Model 400A CT horn unit was coupled with a conventional transducer and a Model 1120 power supply to form the ultrasonic power assembly. The horn face had a length of 8 inches and a width of 0.5 inch and was applied against the web providing a nip gap of about 0.005 inch with the power off.

Water was applied at a rate of about 500 cc per minute per inch of web width with a header pipe located just ahead of the nip and having apertures 0.025 inch in diameter and at 0.10 inch intervals. The wet base web was fed at a rate of about 10 feet per minute into the nip with the horn operating at about 70% output and a frequency of 20,000 cps. Cavitation and intense fiber rearrangement occurred with some knotting of fibers in the areas around the projections. In the groove portions the fibers twisted and were interlocked forming yarn-like bundles around the projections with the land areas substantially free of fibers.

From the nip between the anvil roll and the horn the web was fed onto a wire belt and suction applied to remove loosely held water. At this point the web had sufficient integrity to be dried without support on a can dryer maintained at a temperature of about 240°F.

Figure 11:
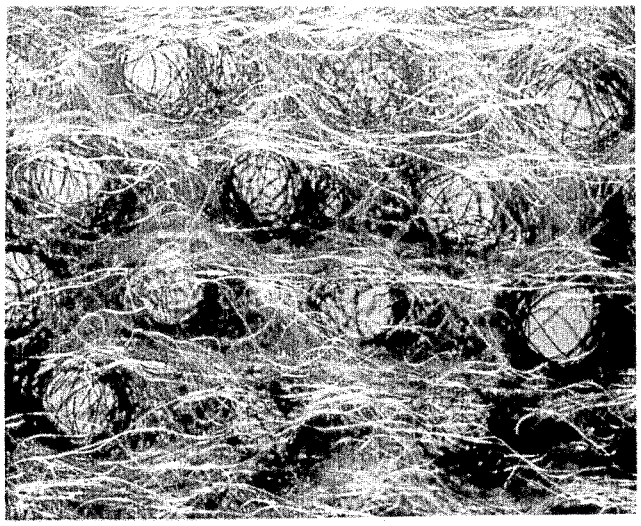
FIGS. 11–20 are photomicrographs taken at a magnification of 12× of webs obtained in accordance with the invention.

The resulting apertured web is illustrated by FIG. 11 and had good tactile, drape and strength properties.

EXAMPLE 2

For this example apparatus was assembled as generally illustrated in FIG. 3. The starting material was a randomly oriented web as in Example 1 having a width of 10 inches and having a weight of about 1.3 oz. per square yard. The woven screen belt used had 18 wires in each of the warp and weft directions with a wire thickness of about 0.02 inch.

A water shower in combination with a suction device was used to wet the web initially, then also immediately prior to each nip a spray was utilized applying additional water to a total of about 5000 cc per full width across the web so as to provide good contact between the aqueous phase and the surface of the horn with a nip gap in each case equivalent to the wetted web thickness of about 0.050 inch with the power off.

Figure 12:
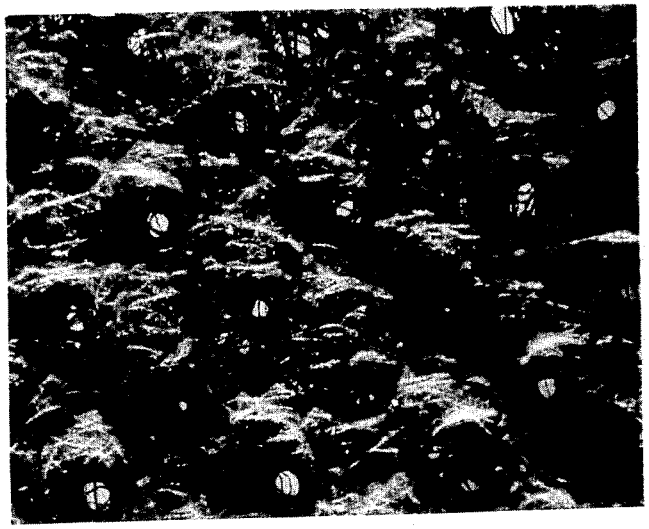

At a machine speed of about 10 feet per minute and horn frequency of 20,000 cps a well integrated and conformable fabric was obtained having the texture illustrated in FIG. 12.

EXAMPLE 3

Example 2 was repeated except that the starting web was 3 inches wide and equipment was used which provided for water addition to be split between the spray application and addition directly through the horn to the nip with the total amount of water added remaining the same. About 50% of the water was added by spraying and 50% through the horn.

Figure 13:
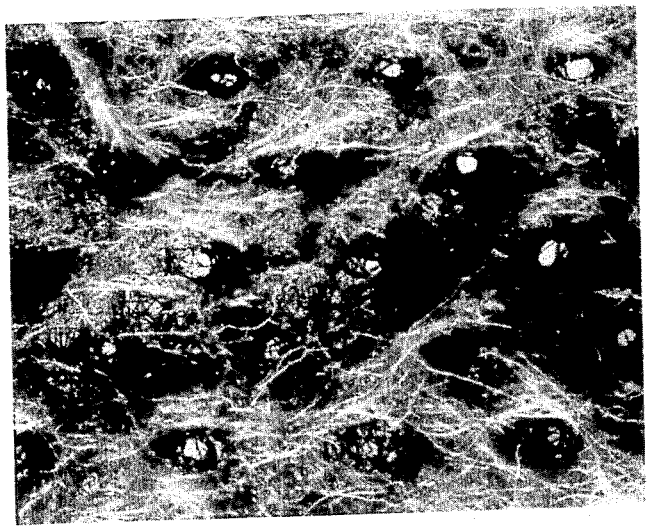

The resulting web, as shown in FIG. 13, was characterized by improved strength although it was somewhat stiffer than the web of Example 2.

EXAMPLE 4

Example 3 was repeated except that water was added in an amount of about 600 cc per minute per inch of web width through the horn directly to the nip.

Figure 14:
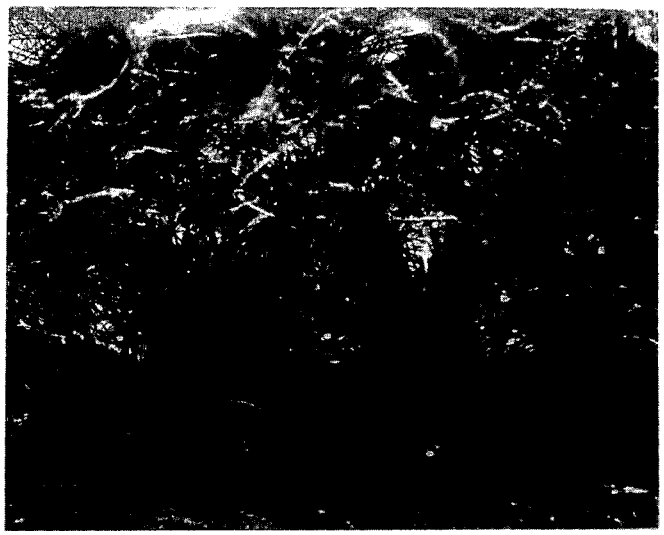

In this example, FIG. 14, the effects on strength and stiffness were even more pronounced.

EXAMPLE 5

Example 4 was repeated except that the geometrical structure of the web support (wire screen) was altered and all the water was added through the horn directly to the nip. The web support was a combination of a fine woven 60 × 80 mesh wire screen on the bottom adhesively bonded to a perforated metal belt on the top. The perforations were circular, about 0.0625 inch in diameter and arranged in parallel lines 0.1 inch from center to center. The lines of perforations formed an angle of 60° with respect to the belt direction of movement (machine direction).

Figure 15:
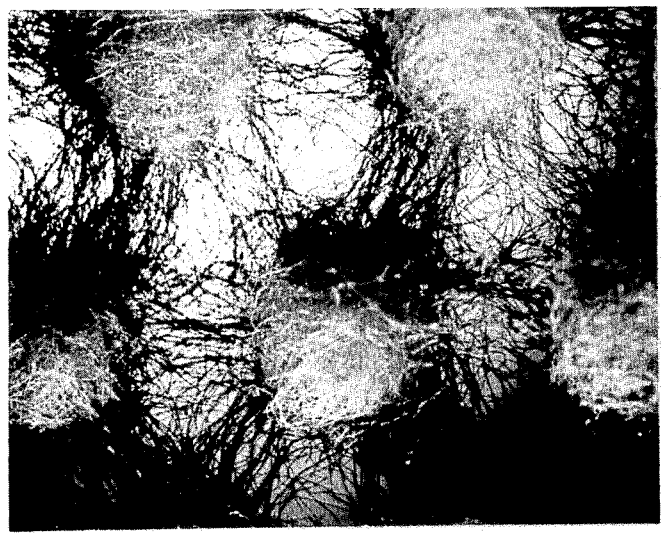

The resulting fabric exhibited exceptionally good rearrangement of fibers into a highly regular, esthetically appealing geometrical structure resembling a lace material as shown in FIG. 15. The fabric was characterized by good integrity and a high degree of softness and drape.

EXAMPLE 6

Example 2 was repeated except that the screen belt was replaced by a fine wire screen having a 80 × 60 mesh size, and the horns were separated from the screen to a point where contact was made with the top surface only of the batt when the power was off. This produced a gap of about 0.08 inch between the horn and the wire screen.

Figure 16:

The resulting web, FIG. 16, was well integrated and conformable with a highly entangled random swirl texture independent of the wire pattern.

EXAMPLE 7

Figure 17:
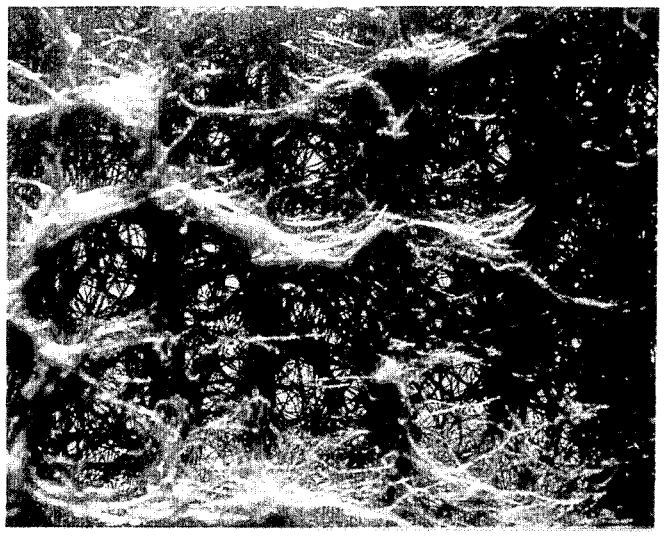

Example 6 was repeated except that a coarse fabric (Rachel double knit) was used as an anvil under the sonic horn. The resulting fabric displayed reinforced fiber bundling and knotting due to the multiple horns employed, and the fibers were realigned according to the geometry of the supporting fabric anvil with some larger fiber strands running in the "machine" direction and other smaller bundles running in the traverse direction. Fibers in the bundles were substantially parallel, in close proximity to each other and interlocked to a moderate degree. At crossover points the fibers were intensely interlocked producing tight knots as illustrated in FIG. 17.

The resulting structure showed two principal configurations superimposed on each other. The bottom fiber portion closest to the supporting fabric exhibited highly oriented fibers in parallel, yarn-like bundles running longitudinally in the "machine" direction. The top portion of fibers closest to the horn were rearranged in interconnected circular patterns. Both portions of the web were interlocked at crossover points.

EXAMPLE 8

Figure 18:
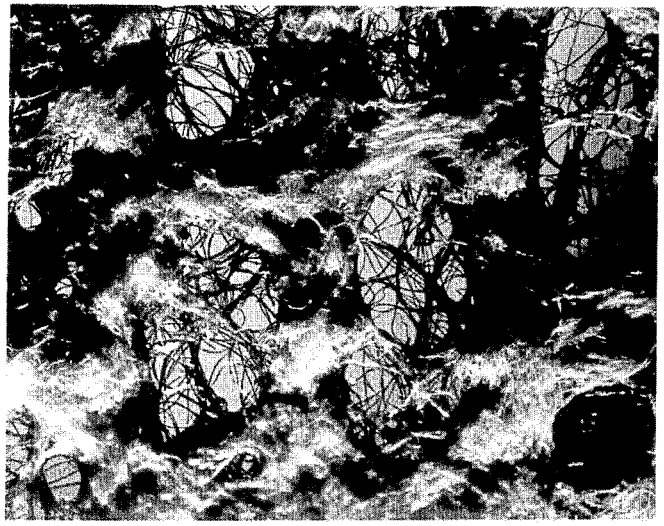

Example 4 was repeated except that the random web also included 25% by weight of wood pulp fibers. The pulp fibers because of smaller size and higher mobility were intermixed with the longer textile fibers throughout the resulting web and rearranged according to the forces acting upon the textile fibers. The pulp fibers tended to become part of the strands thus increasing the interlocking nature of the web as a whole. This effect is shown in FIG. 18.

EXAMPLE 9

Example 4 was repeated except that the water was replaced by an emulsion of an acrylic latex (Rohm and Haas E 751) in water, 5% solids by weight. After drying as previously described, the web was heated at about 220°F for about 5 minutes in a heating oven to cure the adhesive. The resulting fabric had a 3.7% by weight add-on of adhesive and displayed excellent strength and abrasion resistance, but was otherwise similar to the product resulting from Example 4.

EXAMPLE 10

Example 1 was repeated except that the additional apparatus illustrated in phantom lines in FIG. 1 was utilized to demonstrate the combination of two webs. The base airlaid web as described was combined prior to the water spray with a scrim web previously bonded with a latex adhesive (Borden DL-EA-7578) of 40 denier nylon filament yarn having 10 threads per inch in the machine direction and 6 threads per inch in the transverse direction.

Figure 19:
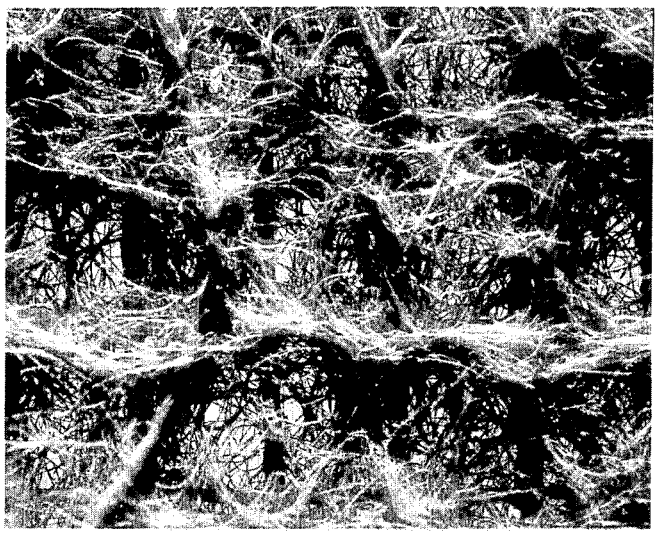

The resulting fabric exhibited strength with the webs being interbonded by mechanical fiber interlocking as illustrated in FIG. 19. Other desirable attributes such as softness and drape were substantially unaffected.

EXAMPLE 11

Figure 20:
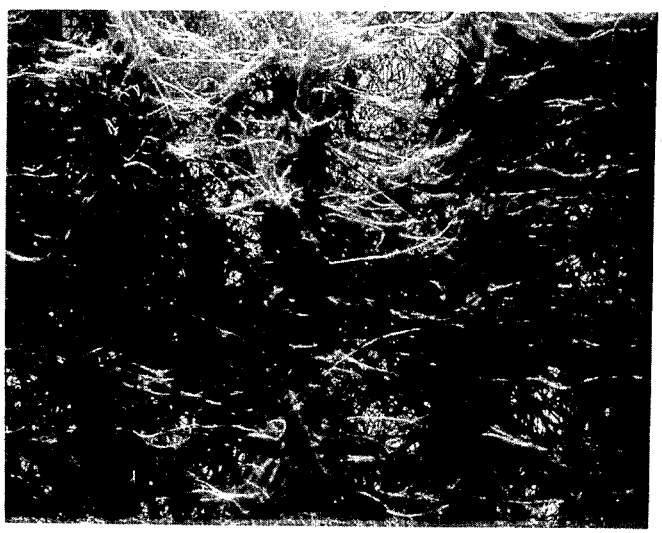

Example 10 was repeated except that the scrim was replaced by a loosely arranged random fiber batt composed of 100% viscose rayon fibers about 0.5 inch in length and 3.0 denier as formed on a Rando-webber, and the base web was a fabric previously bonded as in Example 2. The fiber sandwich was fed through the nip after wetting, and the fibers closest to the horn were rearranged and interlocked to the extent that the two webs were integrated into one as illustrated by FIG. 20.

The resulting fabric was strong and demonstrated the ability to build up heavy basis weight materials.

Table I, below, lists additional physical properties of the webs of the specific examples. For comparison, a dry sonic bonded web has been included. As is apparent, the present invention provides webs having highly desirable combinations of strength and tactile or aesthetic properties.

TABLE I

Summary of Fabric Properties

| Example | Basis Weight ($Oz/Yd^2$) | Grab Tensile Strength ($Lbs/Oz/Yd^2$) MD | | Handle-O-Meter ($Gr/1\ Oz/Yd^2$) AV.MD.CD. | Drape Stiffness ($In/Oz/Yd^2$) CD | Compression Response CWV (In-Grams)* |
|---|---|---|---|---|---|---|
| 1 | 2.44 | 1.15 | 0.75 | 7.9 | 0.42 | 4.34 |
| 2 | 1.30 | 1.24 | 1.05 | 15.2 | 0.62 | 1.47 |
| 3 | 1.13 | 1.85 | 1.40 | 8.0 | 0.57 | 2.52 |
| 4 | 1.29 | 2.63 | 1.75 | 9.3 | 0.70 | 4.13 |
| 5 | 1.08 | 1.25 | 1.11 | 4.6 | 0.75 | 23.3 |
| 6 | 1.18 | 2.31 | 1.78 | 6.5 | 0.54 | 3.14 |
| 7 | 1.19 | 3.78 | 2.21 | 13.0 | 0.84 | 3.76 |
| 8 | 1.30 | 2.42 | 1.87 | 22.0 | 1.08 | 0.99 |
| 9 | 1.43 | 13.35 | 10.93 | 15.4 | 0.70 | 3.96 |
| 10 | 2.37 | 8.81 | 9.25 | 17.9 | 0.46 | 1.80 |
| 11 | 2.30 | 3.52 | 2.94 | 31.7 | 0.79 | 2.54 |
| Dry Sonic Pattern Bond | 1.05 | 10.2 | 8.95 | 45 | 1.01 | 0.7 |

*Normalized for caliper and BW.

"Hand" was determined according to TAPPI T 498SU66 using a Handle-O-Meter. A 9 × 4.5 inches (22.85 cm × 11.42 cm) sample was placed on an instrument platform consisting of two plates which form a slot 0.25 inches (6.25 mm). The center line of the 9 inch width of the fabric was aligned with the slot and/or penetrating blade used to force the specimen into the slot. The force required to do this was measured and reported in grams.

"Softness" was determined by measuring the compression response of a 2 × 2 inch sample in an Instron machine. Here the ease of compressibility (as part of a total impression of softness) was measured as one would feel it when pinching the surfaces of a fabric between his thumb and forefinger to a unit load of 100 grams per square inch. The sample was placed between the compression plates and loaded compressively at a rate of 0.02 inch per minute until the loading per square inch reached 100 grams. A recording unit integrated the compression movement of web surfaces and the loading to give the total work in inch-grams required to reach 100 grams per square inch loading. The work expressed as inch-grams in the compression work value (CWV) reported herein. The caliper of a fabric at 100 grams per square inch is the thickness of the web when subjected to a compressive load of 100 grams per square inch.

"Drape" was determined by increasing the drape flex or bending length of a sample ½ inch wide and 6 inches long. The sample was moved slowly parallel to its longitudinal direction so that the end projected from the edge of the horizontal surface. When the line from the edge of the horizontal surface to the bent specimen lip formed an angle of 41.5° with the horizontal, the length of the overhanging sample was measured. One half of the measured length is the bending length of the sample reported in centimeters.

Tensile strength determinations were obtained on an Instron tester at 70°F and 65% relative humidity using samples 4 inches in width and 6 inches long. The distance between the clamps was 3 inches. The face of one jaw of each clamp was 1 × 1 inch, that of the other jaw of each clamp 1 × 3 inches with the longer dimension perpendicular to the direction of application of the load. The crosshead speed was 12 inches per min. (ASTM Designation: D 1682).

As mentioned previously, the preferred means for driving the liquid into the web is a sonic horn. Such devices are well-known and, typically, the energy source will include a power supply capable of providing the necessary electrical energy and a converter for converting the electrical energy into mechanical energy in the form of vibrations. The converter may be a piezoelectric element made of material such as barium titanate or lead zirconate titanate. The horn is employed to transmit the mechanical vibrations from the converter to the web. The mass and shape of the horn determine the length at which the horn will oscillate at the optimum frequency which is dependent upon the power supply. The energy source thus provides within the region of the horn an intense localized zone of sonic energy. The horn is positioned with respect to the web depending upon the desired web properties. In general, the orientation of the fibers may be controlled by the relative positioning of the horn and the web. The spacing of the nip may be varied from the point where contact is barely made with the liquid to the point where the web is so compressed that fiber movement is limited or restricted. If desired, bonding may be increased by multiple exposure to sonic vibrations as discussed above with respect to FIG. 4 or by post treatments such as embossing, heat setting, dry sonic bonding of the dense entangled areas, and the like.

Sonic bonders are commercially available, for example, from Branson Sonic Power Company, and specific models which can be used include its Model 460 assembly and power supply. The useful range of frequencies for the purposes of the present invention is very wide and includes up to 400,000 cps. However, ultrasonic frequencies up to 40,000 cps are preferred due to increased cavitation effects and the reduction of the noise discomfort which may result from the use of lower frequencies.

A general amplitude range for the vibrations is contemplated to be from about 1 to 30 mils with entanglement increasing as the amplitude is increased. Power requirements will be increased for higher amplitudes, but web strength is increased. For fabric-like properties, an amplitude of at least about 5 mils is preferred.

The particular pattern used for the anvil roll involves a matter of choice. However, the projections must be of sufficient height and spacing to allow cavitation and formation of the vortices to take place in order to develop fiber knotting. This height is preferably at least about the thickness of the formed web where apertures are desired; illustratively, the height may be about 0.01 to 0.25 inch, depending upon the fabric basis weight. The projections, themselves, may be of any desired shape and are, preferably, spaced less than an average fiber length apart so that each fiber spans at least two bond areas, illustratively, about 0.01 to 0.25 inch, center to center, depending upon the nature of the pattern selected. As is known in sonic bonding generally, it is contemplated that, if desired, the anvil roll can be smooth and the horn provided with the bonding pattern.

The web speed will depend upon such factors as basis weight and desired degree of patterning. In general, higher basis weight and greater degrees of patterning will necessitate operation at slower speeds.

When short fibers are added to the liquid, they may be included in any concentration that will permit pumping and spraying onto the base material. In general, when pulp fibers are utilized, concentrations of up to 4% by weight are preferred. When adhesives are added to the liquid, they may be selected from those compositions and concentrations which permit pumping and spraying. Illustratively, solids contents of 2 to 10% by weight may be used depending upon the desired strength and stiffness characteristics.

A particular advantage of the present invention is the ease of liquid application. Since it is only necessary that the liquid be present at the sonic nip, it may be added to the web through the horn or by conventional spraying devices. It is also contemplated that the invention can be used in conjunction with known wet-laid nonwoven processes wherein the sonic nip will be integrated into the system at a point prior to complete drying of the web to avoid entirely the necessity for adding additional liquid. In any event, the amount of liquid present in the web at the sonic nip must be sufficient to provide fiber mobility. Generally this will be at least 500% by weight and preferably at least 1,300% by weight. Increasing the liquid amount greatly in excess is to be avoided as it will tend to wash fibers out and will increase the drying costs.

Webs and laminates produced in accordance with the invention find wide utility as base materials for disposable nonwoven wipes, disposable or limited use garments, bed linens, and as liners for incontinent care products or infant diapers and the like.

Thus, it is apparent that there has been provided, in accordance with the invention, a method for bonding fibrous webs and resulting products that fully satisfy the objects and aims and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications, and variations that fall within the spirit and broad scope of the appended claims.

I claim:

1. Method of bonding a base fibrous web comprising the steps of,
   providing a patterned bonding nip including a hammer adapted to vibrate at high frequencies and an anvil,
   applying a liquid to the web in an amount sufficient to insure the presence of uncombined liquid at said nip,
   vibrating said hammer at high frequencies of up to 400,000 cps with an amplitude in the range of from about 1 to 30 mils, and
   passing said web and liquid through said nip to cause the liquid to be driven into the web by said vibrations and to knot the fibers of the web in the pattern bond areas.

2. The method of claim 1 wherein said vibrations are produced sonically.

3. The method of claim 2 wherein said vibrations are in the range of up to 40,000 cps and have an amplitude in the range of from about 5 to 30 mils.

4. The method of claim 3 wherein said liquid is present at said nip in an amount of at least 1,300% based on the weight of said web.

5. The method of claim 4 wherein said liquid is water.

6. The method of claim 3 wherein said web is an unbonded matrix of fibers ¼ to 4 inches in length of 1 to 10 denier.

7. The method of claim 3 including the additional step of combining a second web with said base fibrous web prior to liquid application and the vibrating nip.

8. The method of claim 3 wherein at least a portion of the liquid is applied to the web at the sonic vibrating nip.

9. The method of claim 3 wherein said liquid includes short fibers.

10. The method of claim 3 wherein said liquid includes an adhesive.

11. The method of claim 3 wherein said anvil comprises a roll having spaced projections.

12. The method of claim 3 wherein said anvil comprises a woven fabric.

13. The method of claim 12 wherein said fabric is a double knit of high loft construction.

14. A method of forming an integrated nonwoven web characterized by textile-like appearance, drape, and hand comprising the steps of, wetting a base web comprising a substantially unbonded matrix of fibers ¼ to 4 inches in length and 1 to 10 denier with at least 500% by weight of a liquid so that said fibers are mobile;

passing said wetted base web through a nip having a spacing adapted to at least produce contact with the base web and formed by a patterned anvil and a horn vibrating at up to 40,000 cps having an amplitude of vibrations in the range of from about 1 to 30 mils; and drying said web.

15. The method of claim 9 wherein said short fibers are pulp and are included in an amount of up to 4%.

* * * * *

UNITED STATES PATENT OFFICE
CERTIFICATE OF CORRECTION

PATENT NO. : 3,966,519
DATED : June 29, 1976
INVENTOR(S) :

It is certified that error appears in the above-identified patent and that said Letters Patent are hereby corrected as shown below:

Column 1, line 53, "November 6," should read
-- November 6, 1973 --.
Column 2, line 1, "intended" should read -- tended --.
Column 2, line 56, "Embodiment" should read -- EMBODIMENTS --.
Column 3, line 33, "avalability" should read -- availability --.
Column 8, Table I, "CD" should appear above Column 4 rather than between Columns 5 and 6.
Column 8, line 56, "in" should read -- is --.

Signed and Sealed this

Nineteenth Day of October 1976

[SEAL]

Attest:

RUTH C. MASON
Attesting Officer

C. MARSHALL DANN
Commissioner of Patents and Trademarks